US009490526B2

(12) United States Patent
Rivera et al.

(10) Patent No.: US 9,490,526 B2
(45) Date of Patent: Nov. 8, 2016

(54) WIRELESS COMMUNICATION ANTENNAS IN COMPUTER DISPLAYS

(75) Inventors: Felix Jose Alvarez Rivera, San Jose, CA (US); Ken Foo, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 327 days.

(21) Appl. No.: 13/585,360

(22) Filed: Aug. 14, 2012

(65) Prior Publication Data

US 2015/0200441 A1 Jul. 16, 2015

(51) Int. Cl.
*H01Q 1/24* (2006.01)
*H01Q 1/22* (2006.01)
*H01Q 21/28* (2006.01)
*G02F 1/1333* (2006.01)
*G02F 1/1362* (2006.01)

(52) U.S. Cl.
CPC ............. *H01Q 1/22* (2013.01); *G02F 1/1333* (2013.01); *G02F 1/136286* (2013.01); *H01Q 1/2266* (2013.01); *H01Q 21/28* (2013.01); *G02F 2001/136295* (2013.01)

(58) Field of Classification Search
CPC ....... H01Q 1/243; H01Q 1/2266; H01Q 1/24
USPC .................................................. 343/702, 720
See application file for complete search history.

(56) References Cited

U.S. PATENT DOCUMENTS

| | | | | |
|---|---|---|---|---|
| 6,822,609 | B2* | 11/2004 | Mendolia et al. ..... | 343/700 MS |
| 7,764,236 | B2* | 7/2010 | Hill et al. ................. | 343/702 |
| 8,044,873 | B2* | 10/2011 | Chiang et al. ............. | 343/768 |
| 2002/0171591 | A1* | 11/2002 | Beard ........................ | 343/702 |
| 2008/0055268 | A1* | 3/2008 | Yoo et al. ................. | 345/173 |
| 2008/0062148 | A1* | 3/2008 | Hotelling et al. ......... | 345/174 |
| 2009/0165296 | A1* | 7/2009 | Carmi ........................ | 29/847 |
| 2010/0073241 | A1* | 3/2010 | Ayala Vazquez et al. ... | 343/702 |
| 2010/0260460 | A1* | 10/2010 | Harrysson et al. ........ | 385/119 |
| 2010/0265417 | A1* | 10/2010 | Harrysson et al. ........ | 348/801 |
| 2011/0291899 | A1* | 12/2011 | Cho et al. ................. | 343/702 |
| 2012/0038519 | A1* | 2/2012 | Su ........................... | H01Q 1/38 |
| | | | | 343/702 |
| 2012/0087065 | A1* | 4/2012 | Kim et al. ................ | 361/679.01 |
| 2012/0178382 | A1* | 7/2012 | Merz et al. ............... | 455/73 |
| 2012/0281162 | A1* | 11/2012 | Chen et al. ............... | 349/58 |
| 2013/0016267 | A1* | 1/2013 | Ko et al. ................. | 348/333.01 |

\* cited by examiner

*Primary Examiner* — Dameon E Levi
*Assistant Examiner* — Hasan Islam
(74) *Attorney, Agent, or Firm* — Brake Hughes Bellermann LLP

(57) ABSTRACT

A liquid crystal display screen of an electronic device is formed on a glass substrate. The glass substrate has an active display area with liquid crystal display elements disposed thereon. The active display area is bordered by an edge area of the glass substrate. Antenna elements are disposed in the edge area of the substrate. The antenna elements are coupled to wireless communications circuitry in the electronic device.

25 Claims, 8 Drawing Sheets

WIRELESS COMMUNICATION ANTENNAS IN COMPUTER DISPLAYS

TECHNICAL FIELD

This description relates to display screens of electronic devices that are enabled for wireless communications.

BACKGROUND

Flat screen displays of electronic devices (e.g., computer monitors, television sets, mobile phones etc.) are often built on a glass base. The displays may include liquid crystal display (LCD) elements that act as light valves to attenuate, filter or modulate light from behind the displays to form viewable images on the displays. The LCD elements are formed as liquid crystal material-filled cells sandwiched between two sheets of glass. The liquid crystal material is in contact with transparent control electrodes deposited on the sheets of glass. Vertical and horizontal polarizing filters are positioned on either side of this sandwich. Color filters may be built in or positioned in front of one of the sheets of glass. The control electrodes, which form a capacitor, may be geometrically patterned and aligned in a matrix to create an array of pixels. Each pixel may include three individually controlled sub-pixels, for example, with either a red, green or blue filter included in the pixel. A level of voltage applied across the control electrodes capacitor (and liquid crystal) in a pixel determines the state of the liquid crystal in the pixel and consequently amount of light that passes through the pixel.

Electronic circuits (LCD drivers), which switch or drive the pixel control electrodes are used to manage and control the data to be displayed pixel-by-pixel. An "active-matrix" type of LCD display, which is commercially prevalent, has two principal assemblies—a "bottom glass" assembly carrying the electronics that drive the display, and a "top glass" assembly containing the actual LCD display elements or color pixels arranged in rows and columns. The bottom glass assembly is formed by a grid of thin film transistor (TFT) circuits deposited on a lower or bottom glass plate. The TFT circuits, which may be made of transparent materials, control the state of each pixel in the display. The pixels, which may be arranged in rows and columns, may be addressed individually by row and column to generate images on the display.

In making an electronic device, the glass base of the screen display is placed on an open top or frame of an electronics box or enclosure, which houses display light sources, electronic circuitry, and other components of the electronics device. The glass base is mechanically supported at its edges by a rim or bezel that runs along the open top of the electronics box.

The rim or bezel of the electronics box of an electronic device can serve purposes other than mechanically supporting the glass base of a flat screen display. Electronic devices (e.g., notebooks, tablets, laptop computers, mobile phones, etc.), which have flat screen displays, often include components that for technical reasons or reasons related device shape or form factor are placed outside the electronics box or enclosure. For example, laptop computers and mobile phones often have radio frequency (RF) or Wi-Fi antenna elements for wireless communications. These antenna elements, which may be formed on printed circuit boards or other substrates, are often disposed on the sides or on the rims of the electronics boxes enclosing the electronic devices.

Consideration is now being given to spatial placements of components of electronic devices having flat screen displays.

SUMMARY

In a general aspect, a computer display screen has a substrate (e.g., a glass substrate) with an active display area bordered by an edge area. One or more image display elements are arrayed in the active display area and one or more antenna elements are arrayed in the edge area of the substrate. In another aspect, the image display elements are liquid crystal display elements coupled to LCD driver integrated circuits that, like the antenna elements, are also disposed in the edge area of the substrate.

In yet another aspect, the antenna elements can be strip antennas that have thicknesses of less than about ten microns. The antenna elements are made of one of aluminum, chromium, copper, molybdenum and tungsten metals. The one or more antenna elements are configured to support wireless communications at one or more frequencies in standard cell phone, Wi-Fi and GPS frequency bands.

In a general aspect, a device includes circuits (e.g., receiver and transmitter circuits) for wireless communications, and a display. One or more antenna elements coupled to the circuits for wireless communications are disposed in a glass base of the display. The antenna elements are made of thin metal films (e.g., aluminum, chromium, copper, molybdenum and tungsten metal films). The antenna elements are, for example, strip antennas having a physical dimension (e.g., a height) that is less than about 10 microns. The one or more antenna elements are configured to support wireless communications at one or more frequencies including, for example, standard frequencies: 850 MHz, 900 MHz, 1575 MHz, 1800 MHz, 1900 MHz, 2170 MHz, 2.4 GHz and 5.0 GHz.

In another aspect, the device display is a liquid crystal display, and one or more of the antenna elements of the circuits for wireless communications are disposed in an edge portion of the glass base bordering an active area of the liquid crystal display.

In a general aspect, a method for preparing a bottom glass assembly of a liquid crystal display includes depositing a metal layer on a glass substrate, and patterning the deposited metal layer to form a gate electrode of a driver integrated circuit, an antenna element for wireless communications and a conductor line of a TFT array circuit on the glass substrate. Patterning the deposited metal layer includes masking and etching a pattern in the metal layer deposited on a glass substrate to form the gate electrode, the antenna element and the conductor line. In another aspect, forming the antenna element includes forming an antenna element designed to support wireless communications at one or more frequencies.

In a further aspect, the method for preparing a bottom glass assembly of a liquid crystal display includes fabricating a driver integrated circuit (e.g., an amorphous silicon thin film transistor) with the formed gate electrode on the glass substrate. In a yet another aspect, the method for preparing a bottom glass assembly of a liquid crystal display includes depositing and patterning an indium tin oxide layer to form pixel electrode arrays for the liquid crystal display.

The details of one or more implementations are set forth in the accompanying drawings and the description below.

Other features will be apparent from the description and drawings, and from the claims.

BRIEF DESCRIPTION OF THE DRAWINGS

Like reference symbols in the various drawings indicate like elements.

DETAILED DESCRIPTION

A display screen of an electronic device includes antenna elements and display driver electronics fabricated on a glass base, in accordance with the principles of the disclosure herein. The antenna elements, which may be formed of thin metal films, may be coupled to radio or Wi-Fi frequency transmitter and/or receiver circuits in the electronic device. The display driver electronics may, for example, include thin film transistor circuits (TFTs). Further, processes for fabricating the antenna elements from thin metal film may be may be integrated with processes for fabricating the TFT circuits, in accordance with the principles with the principles of the disclosure herein.

Figure 1:
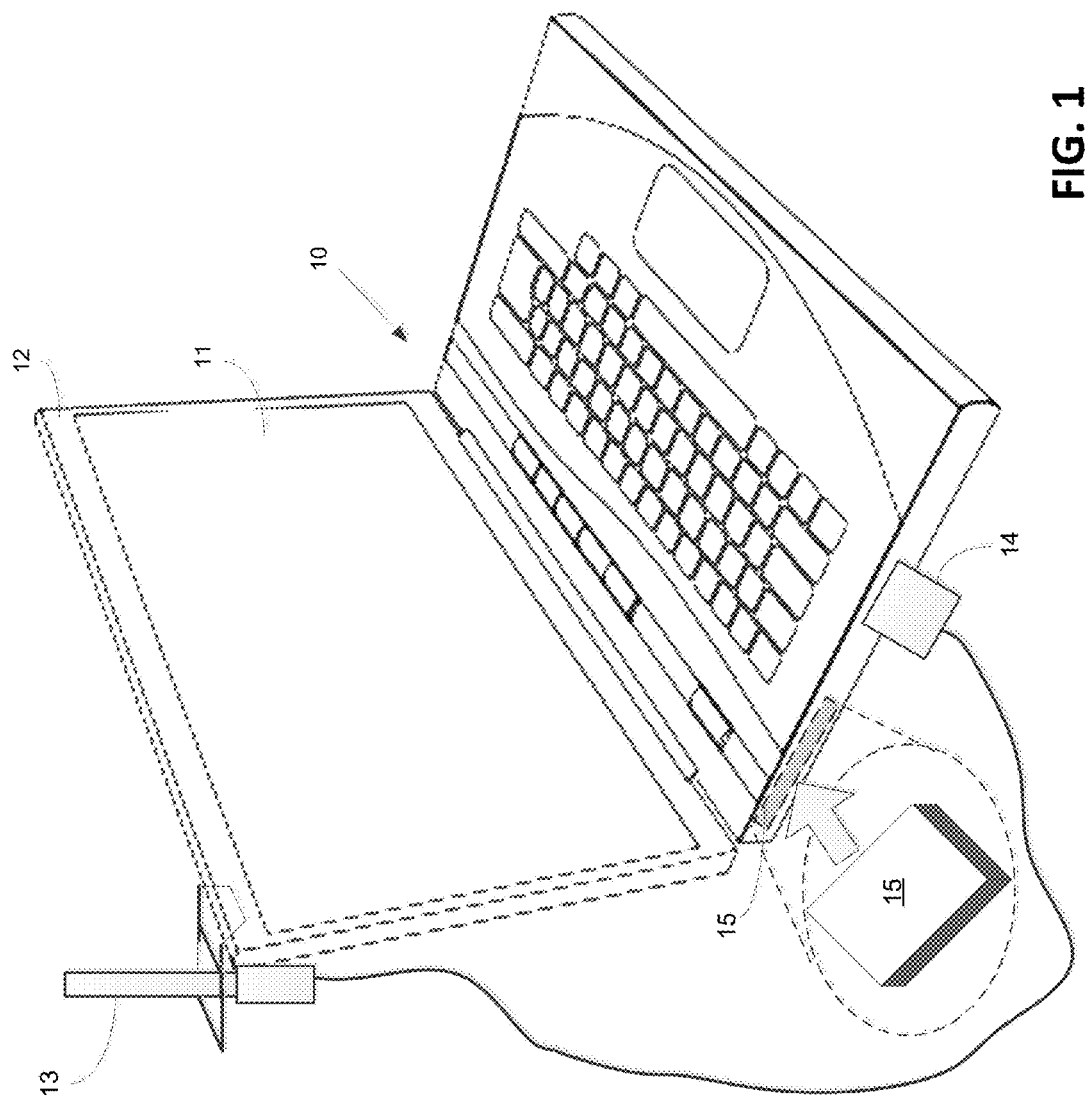
FIG. 1 is schematic illustration of an example portable laptop computer.

FIG. 1 shows a traditional laptop computer 10. Laptop computer 10, which may be battery powered, includes a display 11 mounted on electronics box or casing 12. A user may use laptop computer 11 as a portable electronic device, for example, while traveling or moving to different locations. Laptop computer 10 may include communication circuitry or components for wireless communications (e.g., via a wireless local area network (WLAN) or a cellular telephone system) with other computer systems or other portable digital devices. The communication circuitry or components may include antenna structures (e.g., Wi-Fi and RF antennas) to transmit and receive electromagnetic energy in the form of radio waves. Antenna types may vary. Example antenna types may include wire, aperture, reflector, lens, micro strip or patch antennas, etc. The example wire antennas may include loop, straight wire, helix, or spiral antennas, etc.

The antenna structures for wireless communications may be disposed external to a housing or casing of laptop computer 10. Further, the external antenna structures may be coupled to a peripheral component interface (PCI) card in laptop computer 10 to provide wireless communications. FIG. 1 shows an example external WLAN telescoping antenna 13 mounted on display 11. Telescoping antenna 13 may be connected to laptop computer 10 via a PCI card 14.

Alternatively, the antenna structures may be disposed internal to the housing or casing of laptop computer 10. In contrast to external antenna structures (antenna 13), which protrude from the housing of the computer, internal antenna structures (e.g., patch antennas) can be integrated with the computer housing itself. An internal antenna structure (e.g. a micro strip patch antenna) can be a printed antenna formed on a PCB or a ceramic material substrate. FIG. 1 also shows an example internal patch antenna 15, which may be constructed on a printed circuit board and placed in the housing of laptop computer 10. In other versions of laptop computer 10, patch antennas may be mounted on computer housing surfaces, for example, on a rim of bezel of casing 12 of display 11

Figure 2:
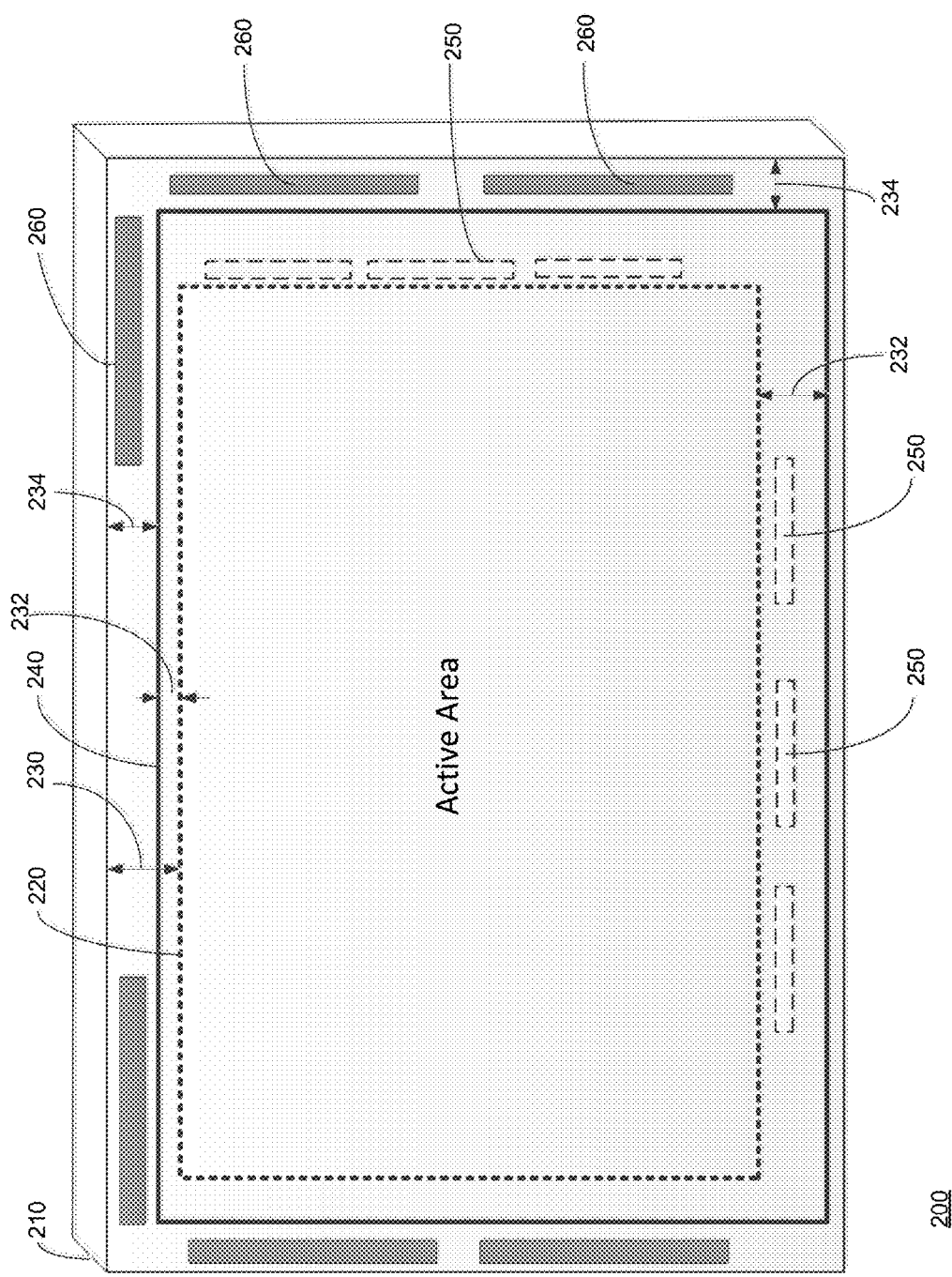
FIG. 2 is a schematic illustration of an example housing or cover of an electronic device having surface-mounted antennas for wireless communications.

FIG. 2 shows an example housing or cover 200 of an electronic device (e.g., a laptop, tablet or notebook computer) having surface-mounted antennas for wireless communications. Cover 200 holds a display screen (e.g., LCD display screen) of the electronic device.

Cover 200 includes a casing 210 with a front surface having a cut out or open area 220 circumscribed by rim or bezel 230. A glass base 240 of the display screen covers open area 220. Edges of glass base 240 may rest flush on a portion 232 of rim or bezel 230 to mechanically support glass base 240 over open area 220. Glass base 240 may include LCD display elements (not shown) in an "active area" of the display screen which conforms to open area 220. Further, glass base 240 may include driver circuits (e.g. row and column driver ICs 250), which address and drive the LCD display elements in the active area. Driver ICs 250 may be disposed on edge portions 234 of rim or bezel 230 that extend beyond portion 232 that supports glass base 240.

In cover 200 of the electronic device, an antenna or array of antennas 260 may be surface-mounted, for example, on rim or bezel 230. Antennas 260 may, for example, be wire antennas or patch antennas formed on printed circuit boards. Surface-mounted antennas 260 may have a thickness profile that results in an uneven surface topography over rim or bezel 230. The uneven surface topography may preclude placing antennas 260 in portion 232 of rim or bezel 230 that is flush with glass base 240. Antennas 260 may have to surface-mounted on a portion 234 of rim or bezel 230 that extends beyond the edges of glass base 240.

In accordance with the principles of the disclosure herein, a low profile antenna element may be formed on a glass base of a display screen. One or more dimensions (e.g., a height) of the low profile antenna may be of the order of a few microns or less. Such a glass base may be placed flush with a rim or bevel surface and may avoid a need to allocate special space (e.g., portion 234 of rim or bezel 230) required for surface-mounting or otherwise including conventional antennas in electronic device housings. The space savings resulting from using a display screen glass base with low profile antennas formed thereon (instead of using conventional antennas in electronic device housings as in FIGS. 1 and 2) may be reallocated, for example, to increasing the active area of the display screen or to decreasing housing size or weight.

Figure 3:
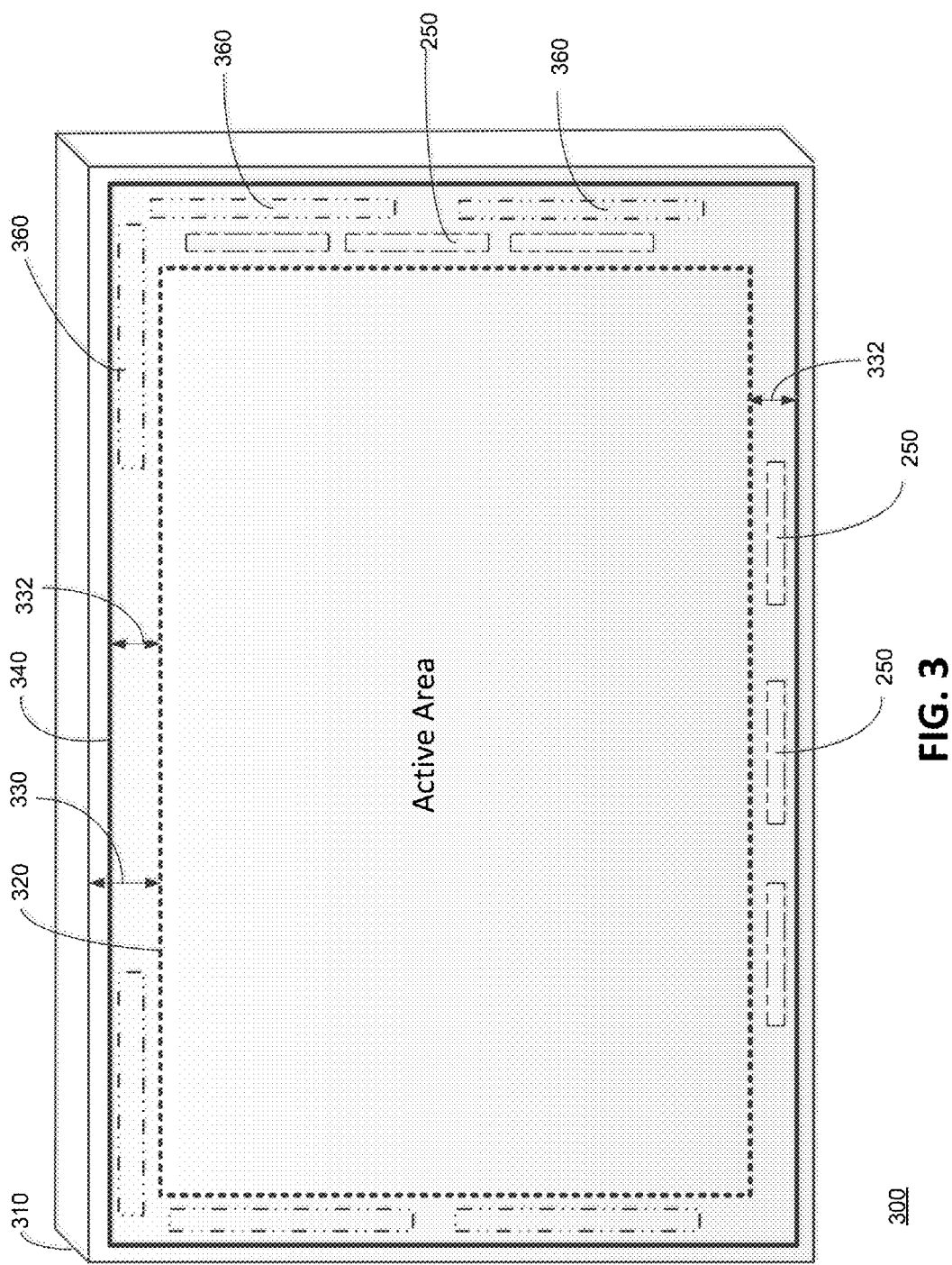
FIG. 3 is a schematic illustration of an example housing or cover of an electronic device having low-profile antennas for wireless communications formed on a display screen of the electronic device, in accordance with the principles of the disclosure herein.

FIG. 3 shows an example housing or cover of an electronic device (e.g., a laptop, tablet or notebook computer) having low-profile antennas for wireless communications arrayed on a display screen (e.g., LCD display screen) of the electronic device, in accordance with the principles of the disclosure herein. The low-profile antennas may be fabricated using materials and processes that are the same or similar to processes that may be commonly used to fabricate TFT driver IC circuits for the display screen.

Cover 300 (like cover 200) includes a casing 310 with a front surface having an open area 320 circumscribed by rim or bezel 330. A glass base 340 of the display screen covers open area 320. Edges of glass base 340 may rest flush on a portion 332 of rim or bezel 330 to mechanically support glass base over open area 320. Glass base 340 may include LCD display elements (not shown) in an "active area" of the display screen which conforms to open area 320. Further, glass base 340 may include driver circuits (e.g., TFT driver ICs 250), which address and drive the LCD display elements in the active area. Driver ICs 250 may be disposed on edge portions of glass base that rest flush on rim or bezel 230. Glass base 340 may also include an antenna or array of antennas 360 formed thereon. Antennas 360 may have a low thickness profile, which, for example, is comparable to a thickness profile of driver ICs 250. The low thickness profile of antennas 360 may allow placing placement of the antennas in portion 332 of rim or bezel 330 which is flush with glass base 340. Space-savings may be obtained by disposing antennas 360 in portion 332 of rim or bezel 330 within the edges of glass base 340 instead of disposing them outside the edges of glass base 340 (e.g., like surface-mounted antennas 260 disposed on portions 234 of rim or bezel 230 beyond the edges of glass base 240 (FIG. 2)). The space savings may be reallocated, for example, to reducing a width of rim or bezel 330 or increasing a size of open area 320 to obtain a larger active area of the display screen in cover 300 (as compared to, for example, cover 200 (FIG. 2)).

Figure 4:
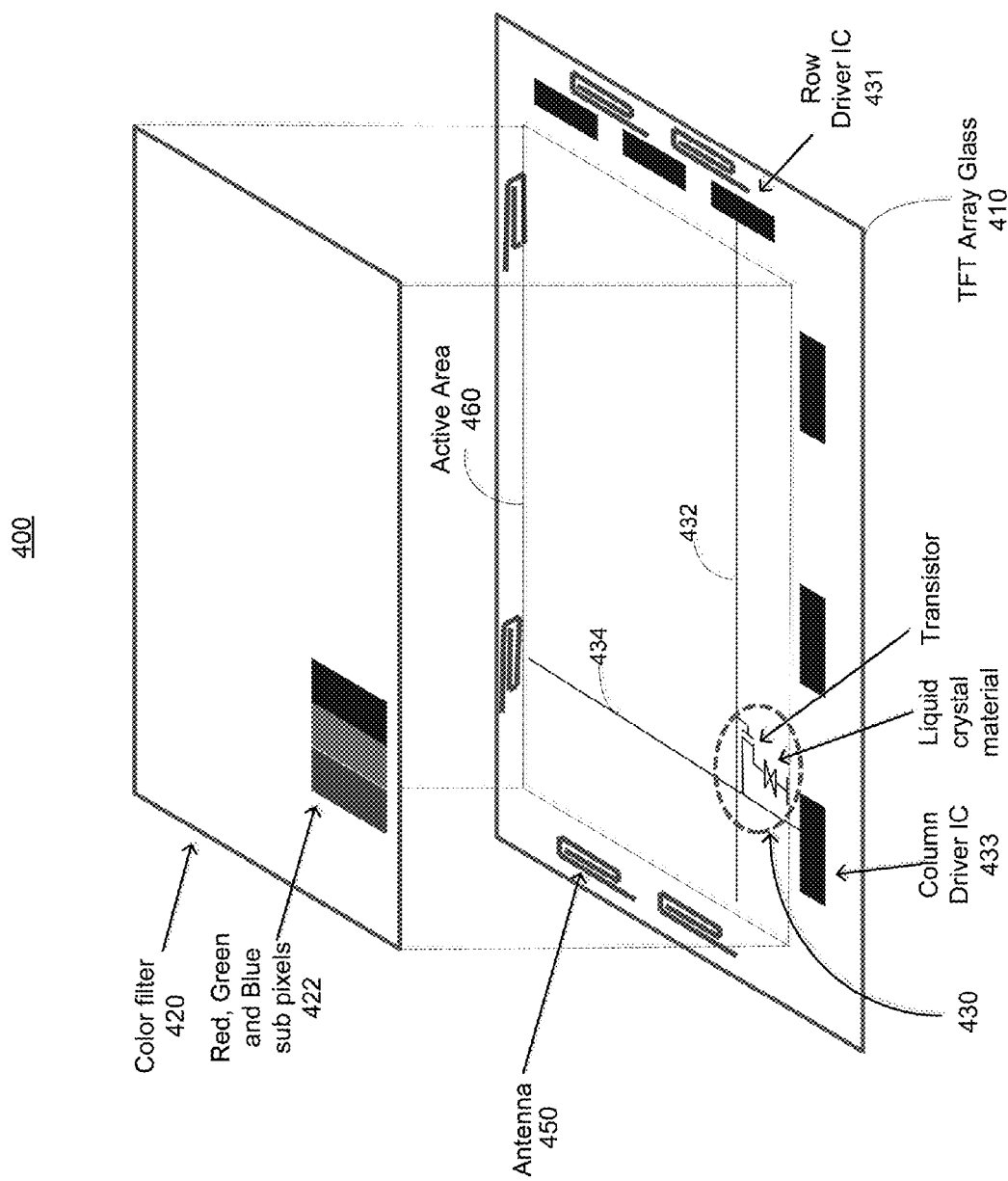
FIG. 4 is a schematic illustration of a LCD display screen having antenna elements formed on its glass base, in accordance with the principles of the disclosure herein.

FIG. 4 shows an exploded view of a LCD display screen 400 having antenna elements 450 formed on its glass base. Antenna elements 450, which may be strip antennas having a low thickness profile, may be made of a conductive metal (e.g., copper, aluminum, or chromium). Antenna elements 450 may be configured to support wireless communications over a single frequency band or multi frequency bands. Antenna elements 450 may, for example, be configured to support wireless communications over one or more of cellular telephone frequency bands (e.g., 850 MHz, 900 MHz, 1800 MHz, and 1900 MHz,), data service bands (e.g., 2170 MHz), Wi-Fi or WLAN bands (e.g., 2.4 GHz and 5.0 GHz) and global positioning system bands (e.g., 1575 MHz).

LCD display screen 400 includes a bottom glass assembly (e.g., TFT array glass sheet 410) and a color filter sheet 420. Liquid crystal display elements that are arranged in an array of pixels may be sandwiched between TFT array glass sheet 410 and color filter sheet 420. The liquid crystal display elements/pixels may extend over an active area 460. For visual clarity, components of the liquid crystal display elements/pixels (e.g., liquid crystal material, pixel electrodes, TFT drivers, etc.) are not shown fully in FIG. 4, but are represented by pixel circuit 430 lying at about an intersection of row and column conductor lines 432 and 434 that extend from row and column driver ICs 431 and 433, respectively. Similarly, color patterns or arrays in color filter sheet 420 are not shown fully in FIG. 2, but are represented by red, blue and green sub-pixels 422 lying vertically above pixel circuit 430.

In LCD display screen 400, antenna elements 450 and row and column driver ICs 431 and 433 lie on edge portions of TFT array glass sheet 410 bordering active area 460. Conventional microelectronic industry packaging techniques including, for example, use of wire bonding pads, wiring boards, and flexible printed circuits, may be utilized to wire and electrically connect TFT driver circuit elements (e.g., driver ICs 431 and 433) to external circuits. Antenna elements 450 may be similarly connected or coupled to off-glass sheet wireless communication circuits using, for example, bonded wires or micro coaxial cables.

Figure 5:
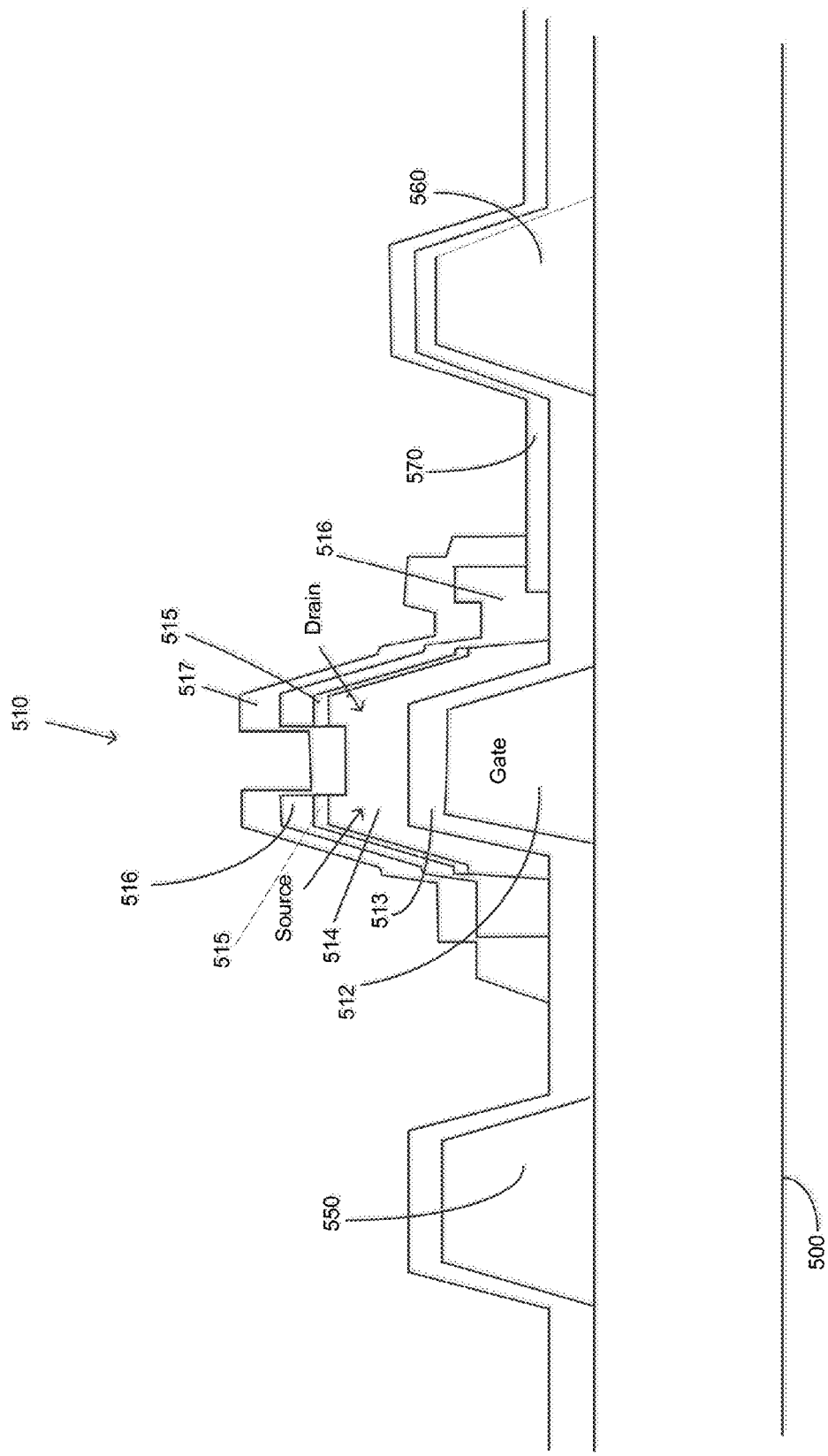
FIG. 5 is a schematic illustration of an example glass substrate carrying thin film transistor, an antenna element, a pixel electrode 560, and a row or column conductor line, in accordance with the principles of the disclosure herein.

FIG. 5 shows an example glass substrate 500 carrying a thin film transistor 510, an antenna element 550, a pixel electrode 560, and a row or column conductor line 570. Glass substrate 500 may be a glass substrate (e.g., a 0.7 mm thick Corning 1737 glass substrate) that can serve as the bottom glass of a LCD display screen. Thin film transistor 510 may be of a type that can be included in TFT driver circuits (e.g., as a row or column driver ICs 431 and 433) for driving LCD display elements in the LCD display screen. Thin film transistor 510, may include a gate electrode 512 covered by a gate insulator layer 513, a semiconductor layer or transistor body 514, an ohmic contact layer 515, source and drain metallization layers 516, and a surface passivation layer 517. Further, in the example shown, antenna element 550 may be a strip antenna made of a metal strip. Row or column conductor line 570 may also be a metal line and pixel electrode 560 may be a layer of transparent conductive material.

In the example shown in FIG. 5, thin film transistor 510 may be a conventional n-type amorphous silicon (a-Si) field effect transistor with semiconductor layer 514 made of a-Si material and ohmic contact layer 515 made of $n^+$ a-Si material. Gate electrode 512, source and drain metallization layers 516, and row or column conductor line 570 may be made of chromium metal. Gate insulator layer 513 and surface passivation layer 517 may be made of silicon nitride materials, and pixel electrode 560 may be made of indium tin oxide (ITO) material. Further, in the example shown, antenna element 550 may be a strip antenna made of metal (e.g., Cr, Ta, Mo, Cu, Al, $CrO_x$, etc.). One or more dimensions (e.g., a height) of antenna element 550 may be of the order of a few microns or less.

Figure 6:
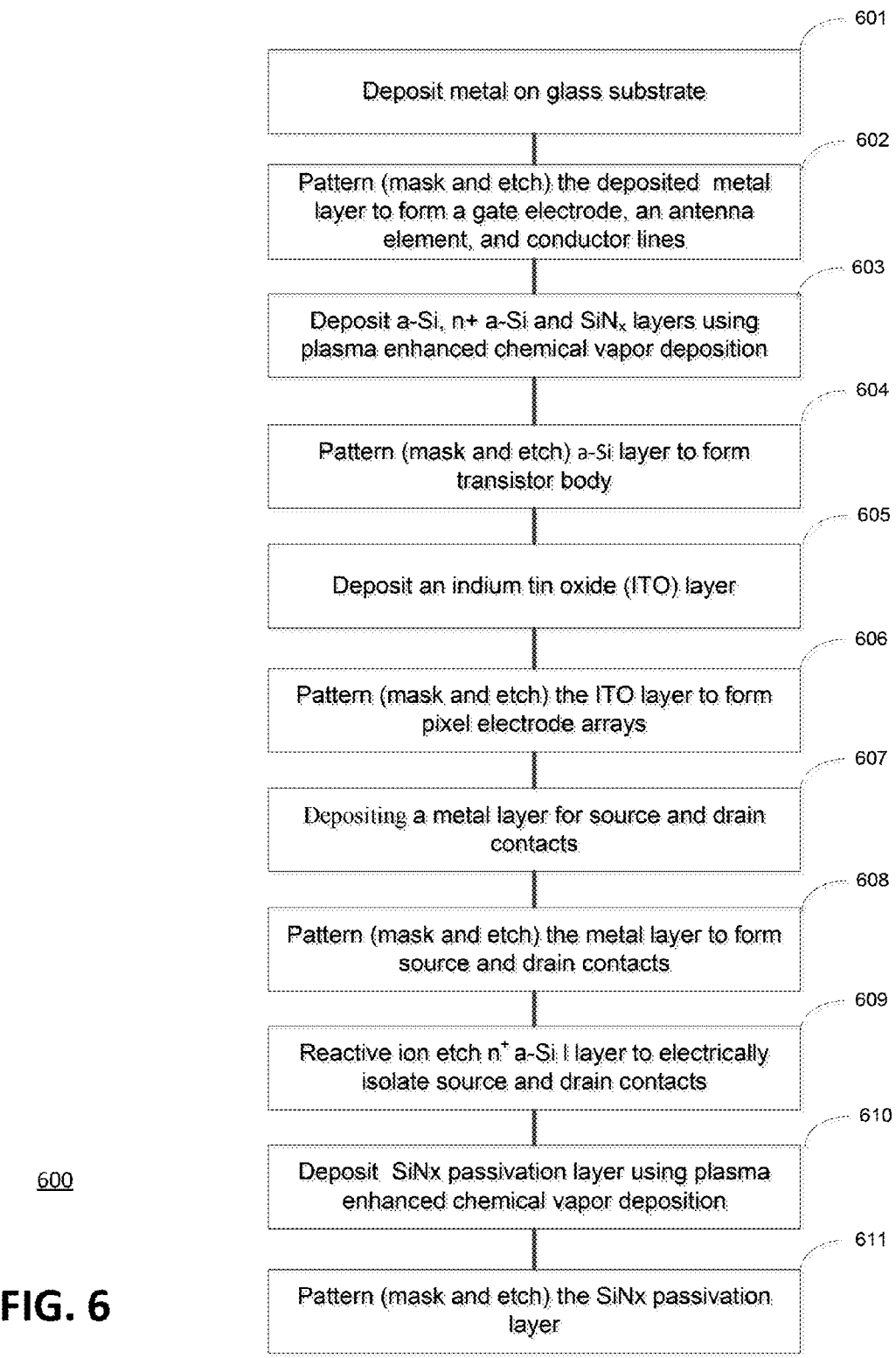
FIG. 6 is a flowchart illustrating an example method for fabricating wireless communications antennas on a computer LCD display screen, in accordance with the principles of the disclosure herein.

As noted previously, low profile antenna elements (antenna elements 450, 550, etc.) of the present disclosure may be fabricated using materials and processes that are the same or similar to materials and processes used to fabricate conventional TFT driver circuits for an LCD display screen. FIG. 6 shows an example method 600 for fabricating thin film transistors (e.g., thin film transistor 510) and antenna elements (e.g., antenna element 550) on a glass substrate (e.g., glass substrate 500) in an integrated or unified manner. Method 600 may involve fabrication techniques and sub-processes (e.g., sputtering, chemical vapor deposition, masking and photolithographic patterning, reactive ion etching, etc.) that are common in the microelectronic device fabrication industry. For brevity herein, such common fabrication techniques and sub-processes used the microelectronic device fabrication industry may be mentioned, but may not be described in detail, in the context of method 600.

Method 600 may begin with depositing a metal layer (e.g., chromium) on a glass substrate (601), and patterning the deposited metal (602) to form an antenna element (e.g., antenna element 550), a gate electrode (e.g., gate electrode 512), and a row or column conductor line (e.g., line 570) on the glass substrate. Depositing a metal layer 601 may involve, for example, sputtering, electro-deposition, or evaporation of metal on to the glass substrate.

Next, method 600 may involve depositing a-Si, $n^+$ a-Si and $SiN_x$ layers (603) using, for example plasma enhanced chemical vapor deposition (PECVD) techniques, and patterning the a-Si layer (604) to form a semiconductor transistor body. Further, method 600 may include sputtering an indium tin oxide (ITO) layer (605), and patterning the ITO layer (606) to form pixel electrodes. After which method 600 may involve sputtering a contact metal layer (607) and patterning the metal layer to form source and drain contacts (608). Method 600 may next involve reactive ion etching to etch back the $n^+$ a-Si layer (609) to electrically isolate source and drain contacts. This may be followed by depositing a $SiN_x$ passivation layer (610) using, for example, PECVD, and patterning the deposited $SiN_x$ passivation layer (611).

It will be understood that the various patterning and etching processes (e.g., processes 602, 604, 606, 608 and 611) in method 600 may involve conventional photolithographic masking and etching techniques. Further it will be noted that method 600 as described uses five masks for various patterning and etching processes (e.g., an antenna and gate pattern mask, an a-Si pattern mask, an ITO pattern mask, a source-drain pattern mask and a $SiN_x$ passivation etch mask). The first mask may be used in patterning the deposited metal 602 to define the antenna elements, the gate electrodes, and the row and column conductor lines. In method 600 as described above the same deposited metal layer material (e.g., Cr) may be used to form the antenna elements, the gate electrodes and row and column conductor lines. For some display designs, different deposited metals layers may be used to form, for example, the antenna elements and the gate electrodes. For fabricating such displays, method 600 may be suitably modified to include use of an additional mask to separately pattern the antenna elements and the gate electrodes from the different deposited metals layers.

It will also be noted that in method 600, processes or sub-processes (e.g., 603-611) after forming the antenna element and the gate electrode on the glass substrate (e.g., by patterning the deposited metal layer 602) may be identical or similar to conventional processes for fabricating LCD TFT arrays.

Figure 7:
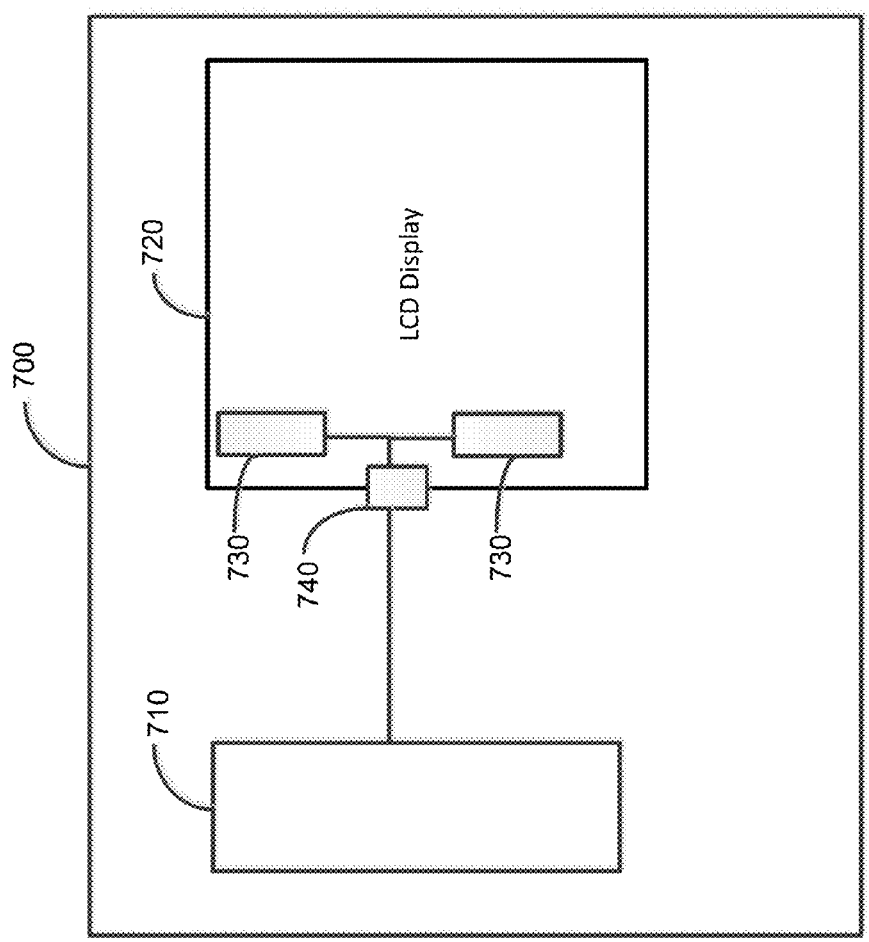
FIG. 7 is block diagram illustration of an electronic device having wireless communications circuits, which are coupled to antenna elements that are placed in a glass base of a display screen, in accordance with the principles of the disclosure herein.

FIG. 7 shows a block diagram representation of an electronic device 700 (e.g., a notebook or tablet computer, or a smart phone) with wireless communications capabilities, in accordance with the principles of the disclosure herein. Electronic device 700 may include wireless communication circuitry 710 and a display screen 720 (e.g., a TFT-LCD screen). Wireless communication circuitry 710 may, for example, include RF or Wi-Fi transmitter and/or receiver circuits. Wireless communication circuitry 710 may be configured for communications at one or more frequencies including, for example, one or more standard frequencies: 850 MHz, 900 MHz, 1575 MHz, 1800 MHz, 1900 MHz, 2170 MHz, 2.4 GHz and 5.0 GHz. In electronic device 700, wireless communication antenna elements 730 (e.g., antenna elements 450 and 550) may be disposed in a glass base of display screen 720. Antenna elements 730 in the glass base may be electrically coupled or connected to wireless communication circuitry 710 via an interface connector 740, which may be formed on or attached to edges of the glass base of display screen 720. Interface connector 740 may, for example, be an adhesive plastic ribbon with conductive traces glued to the edges of the glass base of display screen 720, or a strip of rubber or silicone with alternating layers of conductive and insulating pathways pressed on contact pads on the edges of the glass base of display screen 720.

Figure 8:
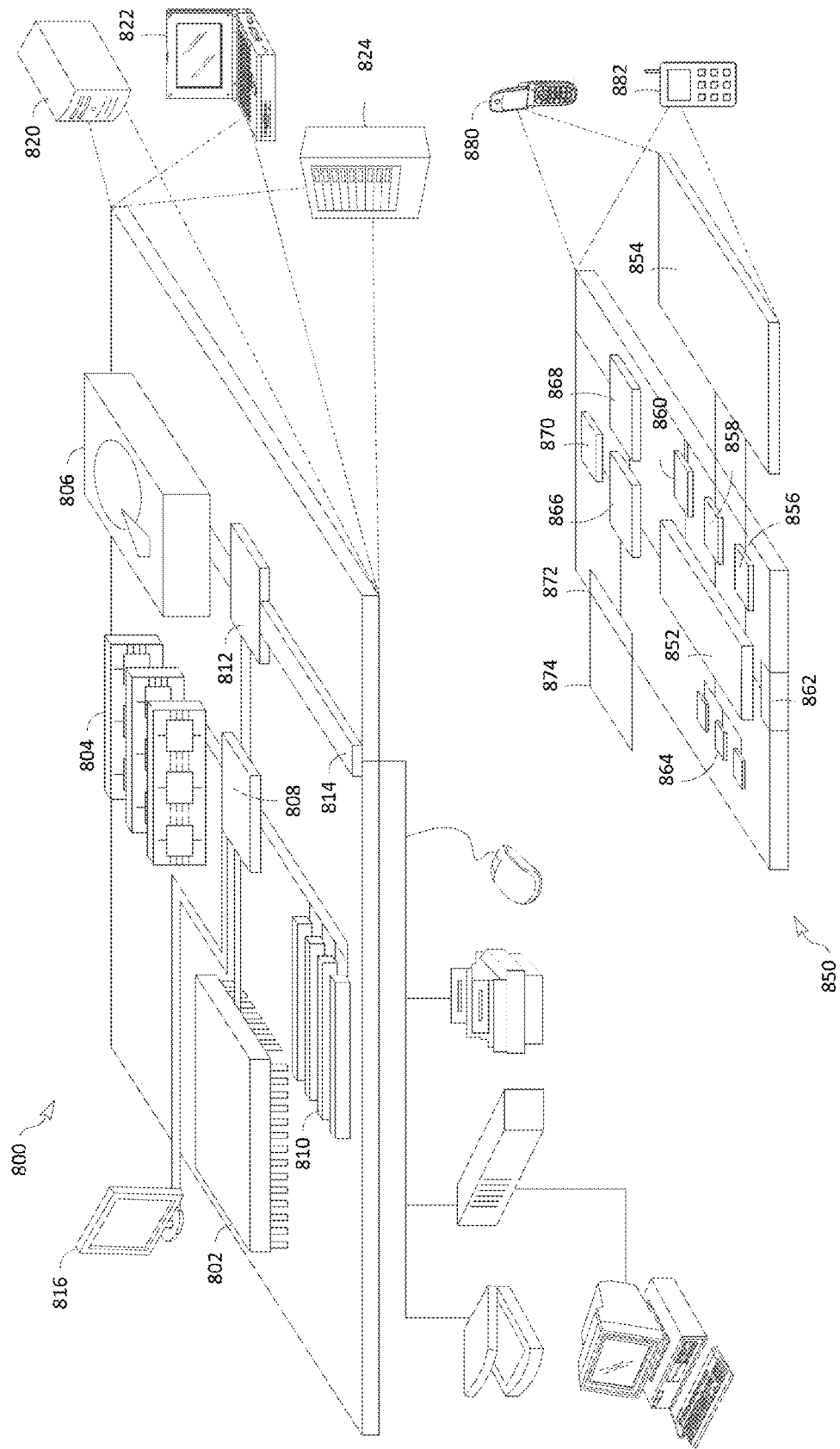
FIG. 8 is an illustration of an example computer device and an example mobile computer device that can be used to implement the systems and methods shown in FIGS. 3-7.

FIG. 8 shows an example of a generic computer device 800 and a generic mobile computer device 850, which may have display screens with antenna elements, disposed the glass bases of the display screens. The antenna elements, which may be configured for wireless communications, may be the same or similar to antenna elements described above with reference to FIGS. 1-7. Computing device 800 is intended to represent various forms of digital computing devices, such as laptop computers, desktop computers, tablet computers, televisions, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. The display can include, for example, a TFT LCD (Thin-Film-Transistor Liquid Crystal Display) or an OLED (Organic Light Emitting Diode) display, or other appropriate display technology that includes a backlight for providing light to a portion of the display that includes pixels having variable transmissivities.

Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, an imaging device (e.g., web cam 818) or a networking device such as a switch or router, e.g., through a network adapter.

The computing device 800 may be implemented in a number of different forms, as shown in the figure. For example, it may be implemented as a standard server 820, or multiple times in a group of such servers (such as map servers, transit data servers, etc.). It may also be implemented as part of a rack server system 824. In addition, it may be implemented in a personal computer such as a laptop computer 822. Alternatively, components from computing device 800 may be combined with other components in a mobile device, such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. For example, a special purpose mapping program may provide routing options based on geographic searches entered by a user, and may utilize map data and other data (e.g., transit data, weather data) provided by one or more servers or databases connected to device 800, for example.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer.

Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input. For example, users may touch or swipe a touch-screen to provide input to a device without requiring the use of a keypad, mouse, or pointer.

A number of implementations have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims. For example, the displays screens described herein, which have antenna elements disposed in an edge area bordering an active display area, may be fabricated using polymer or flexible substrates instead of glass substrates. Further, for example, light emitting diodes or other types of display elements may be deployed in the active area of the displays screens instead or the LCD display elements described herein.

What is claimed is:

1. A computer display screen, comprising:
   a substrate having an active display area and an edge area adjacent to the active display area, the substrate being a thin-film transistor (TFT) array substrate, the active display area being defined by a plurality of image display elements coupled to the substrate;
   one or more TFT driver integrated circuits disposed on the edge area of the substrate and apart from the active display area, the one or more TFT driver integrated circuits configured to drive the plurality of image display elements; and
   one or more antenna elements disposed on the edge area of the substrate and apart from the active display area, the edge area being disposed in a same plane as the active display area, the one or more antenna elements including metallization patterns deposited on the edge area of the substrate in a location separate from the active display area.

2. The computer display screen of claim 1, wherein the substrate is a glass sheet.

3. The computer display screen of claim 1, wherein the plurality of image display elements are liquid crystal display elements.

4. The computer display screen of claim 1, wherein an antenna element is disposed proximate to one of the TFT driver integrated circuits on the TFT array substrate.

5. The computer display screen of claim 1, wherein the one or more antenna elements are made of one of aluminum, chromium, copper, molybdenum and tungsten metals.

6. The computer display screen of claim 1, wherein the one or more antenna elements are strip antennas.

7. The computer display screen of claim 1, wherein the one or more antenna elements have a physical dimension that is less than about 10 microns.

8. The computer display screen of claim 1, wherein the one or more antenna elements are configured to support wireless communications at one or more frequencies.

9. The computer display screen of claim 8, wherein the one or more frequencies include one or more standard frequencies: 850 MHz, 900 MHz, 1575 MHz, 1800 MHz, 1900 MHz, 2170 MHz, 2.4 GHz and 5.0 GHz.

10. A laptop device, comprising:
    a casing with a front surface having an open area;
    a thin-film transistor (TFT) array glass substrate defining an active area and an edge portion surrounding the active area, the active area having a plurality of display elements, the active area having a size that conforms to a size of the open area;
    a plurality of TFT driver integrated circuits disposed on the edge portion of the TFT array glass substrate and apart from the active display area, the plurality of TFT driver integrated circuits being configured to drive the plurality of display elements;
    a bezel disposed around the open area of the front surface, a portion of the bezel contacting the edge portion of the substrate such that the bezel is configured to support the substrate over the open area;
    a plurality of open loop antenna elements disposed on the edge portion of the TFT array glass substrate apart from the active area, at least one open loop antenna element being disposed proximate to one of the TFT driver integrated circuits, the edge portion of the TFT array glass substrate being disposed in a same plane as the active area of the TFT array glass substrate, the at least one open loop antenna element including at least one metallization pattern deposited on the edge portion of the TFT glass substrate in a location separate from the active area of the TFT array glass substrate; and
    a color filter sheet disposed on the TFT array glass substrate such that the plurality of display elements are disposed between the color filter sheet and the TFT array glass substrate.

11. The laptop device of claim 10, wherein the at least one open loop antenna element is a thin metal film.

12. The laptop device of claim 10, wherein the at least one open loop antenna element is made of one of aluminum, chromium, copper, molybdenum and tungsten metals.

13. The laptop device of claim 10, wherein the at least one open loop antenna element is a strip antenna.

14. The laptop device of claim 10, wherein the at least one open loop antenna element has a physical dimension that is less than about 10 microns.

15. The laptop device of claim 10, wherein the at least one open loop antenna element is configured to support wireless communications at one or more frequencies.

16. The laptop device of claim 15, wherein the one or more frequencies include one or more standard frequencies: 850 MHz, 900 MHz, 1575 MHz, 1800 MHz, 1900 MHz, 2170 MHz, 2.4 GHz and 5.0 GHz.

17. The laptop device of claim 10, wherein a portion of the bezel overlaps with the at least one open loop antenna element.

18. A device comprising:
  a glass substrate having an active display area and a perimeter portion surrounding the active display area, the active display area including a plurality of light-emitting pixel elements, the perimeter portion being devoid of light-emitting pixel elements;
  a driver integrated circuit disposed on the perimeter portion of the glass substrate, the driver integrated circuit configured to drive the plurality of light-emitting pixel elements;
  a first antenna element disposed on the perimeter portion of the glass substrate and apart from the active display area of the glass substrate; and
  a second antenna element disposed on the perimeter portion of the glass substrate and apart from the active display area of the glass substrate, the second antenna element being disposed a distance away from the first antenna element but proximate to the driver integrated circuit, the first and second antenna elements being metallization patterns deposited on separate perimeter portions of the glass substrate, the perimeter portion being disposed in a same plane as the active display area of the glass substrate.

19. The device of claim 18, wherein the perimeter portion includes a first side portion and a second side portion, the first side portion being parallel to the second side portion, the active display area being disposed between the first side portion and the second side portion, the first antenna element being disposed on the first side portion of the perimeter portion, the second antenna element being disposed on the second side portion of the perimeter portion.

20. The device of claim 18, wherein the perimeter portion includes a third side portion perpendicular to the first side portion, wherein the device further comprises:
  a third antenna element disposed on the third side portion.

21. The device of claim 18, further comprising:
  a casing with a front surface having an open area, the active area having a size conforming to a size of the open area; and
  a bezel disposed around the open area of the front surface, a portion of the bezel overlapping with the perimeter portion of the glass substrate such that the bezel is configured to support the glass substrate over the open area.

22. The device of claim 18, wherein the driver integrated circuit includes a gate electrode being constructed of a metal material coupled to the perimeter portion, the first and second antenna elements being constructed of a metal material coupled to the perimeter portion, the metal material of the first and second antenna elements being a same metal material as the metal material of the gate electrode.

23. The device of claim 18, further comprising:
  a plurality of row and column conductor lines extending between the plurality of light-emitting pixel elements, the plurality of row column conductor lines being coupled to the driver integrated circuit.

24. The device of claim 18 further comprising:
  a color filter sheet disposed on the glass substrate such that the plurality of light-emitting pixel elements are disposed between the color filter sheet and the glass substrate.

25. The device of claim 18, wherein the first antenna element includes a loop portion.

* * * * *